Nov. 20, 1951 W. R. SEARS 2,575,532
AIRPLANE CONTROL DEVICE
Filed Jan. 20, 1945 4 Sheets-Sheet 1

INVENTOR.
WILLIAM R. SEARS
BY
ATTORNEY

Nov. 20, 1951     W. R. SEARS     2,575,532
AIRPLANE CONTROL DEVICE

Filed Jan. 20, 1945     4 Sheets-Sheet 2

INVENTOR.
WILLIAM R. SEARS
BY
ATTORNEY

INVENTOR.
WILLIAM R. SEARS

Patented Nov. 20, 1951

2,575,532

UNITED STATES PATENT OFFICE 2,575,532

AIRPLANE CONTROL DEVICE

William R. Sears, Inglewood, Calif., assignor to Northrop Aircraft, Inc., Hawthorne, Calif., a corporation of California Application January 20, 1945, Serial No. 573,684

11 Claims. (Cl. 244—82)

This invention relates generally to aircraft, and more particularly to means for influencing the behavior of the airplane control surfaces.

In one aspect, the present invention may be characterized as dealing with and providing a novel and particularly effective solution for the problem of maintenance of "stick-free" longitudinal stability in an airplane of either conventional or tailless types. As is well known, at high angles of attack approaching the stall, and with the onset of separation of the boundary layer from the surface of the airfoil, there is a sudden marked change in the chordwise pressure distribution over the airfoil, creating an abruptly increased increment of hinge moment in the control surfaces in the trailing edge of the airfoil disproportionate to the increment of angle of attack. The effect of this disproportionate increase in hinge moment during the last few degrees of change in the angle of attack as the wing approaches and passes the stalling angle is to cause an abrupt transition from a relatively slight upwardly trailing tendency on the part of the control surface at low or moderate angles of attack, to a greatly increased upwardly trailing tendency at only a few degrees more angle of attack. In the case of elevators or elevons which are rigged to move up or down simultaneously, this increment of hinge moment is transmitted back to the control stick and acts to displace the latter rearwardly from its neutral centered position. This rearward displacement of the control stick must be resisted by applying a corrective force to return it to neutral in order to maintain the equilibrium, or trim, of the airplane, as otherwise the stalling moment produced by the upwardly deflected elevators will cause the airplane to nose up still further to a stall, with consequent loss of control. The requirement of a force on the control stick to return it to neutral from a deflected position is the reverse of the condition existing at only slightly lower angles of attack, hence the phenomenon is known as "stick-force reversal," and its occurrence during the critical period of take off and landing when the airplane is at a high angle of attack is highly undesirable. Various expedients have been devised in the past to counteract this destabilizing effect caused by the trailing tendency of the elevators, but none of these, to my knowledge, has been entirely effective for all angles of attack.

One of the primary objects of the present invention, therefore, is to provide a novel and improved means for maintaining the longitudinal stability of an airplane at all angles of attack.

Another object of the invention is to provide means for overcoming or counteracting the increment of hinge moment produced in the control surfaces at high angles of attack by reason of the change in chordwise pressure distribution over the wing at or near the stalled condition. This will eliminate the phenomenon known as "aileron snatching" in ailerons located conventionally in the trailing edge of a wing. This phenomenon manifests itself as a sudden force reversal on the control column in a lateral direction, causing the control column to be pulled forcibly over to one side to its extreme position unless restrained by the pilot, and commonly occurs as the stalling angle is approached, especially if the aileron linkage incorporates a differential motion arrangement, so that the mechanical advantages of the up- and down-going ailerons are not equal. It results from the up-floating tendency of the ailerons near the stall.

A further object of the invention is to provide a system for control surfaces which provides both an aerodynamic boost effect augmenting the pilot's control force, and a stabilizing effect tending to resist or overcome the upwardly trailing tendency of the control surface at high angles of attack.

A second aspect of my invention deals with the problem of stabilizing a tailless airplane wherein the center of gravity of the airplane is located aft of the aerodynamic center of the wing. It has long been held that inherent longitudinal stability could be had in a tailless airplane only by locating the center of gravity ahead of the aerodynamic center so that the pitching moment of the wing, without control-surface deflection, at all angles of attack tends to restore the wing to a condition of equilibrium at which the moment coefficient about the center of gravity is equal to zero. In this conventional design of tailless airplanes, the elevators, or elevons, must be deflected upwardly in order to increase the angle of attack, as when landing or taking off, but such upward deflection of elevators located in the trailing edge of and forming a part of the wing imposes a considerable download on the wing, neutralizing much of the added lift gained by increasing the angle of attack. By locating the center of gravity of the airplane to the rear of the aerodynamic center of the wing, and applying a corrective wing moment through the use of a negative or downwardly-deflected elevator, as taught in my pending application, Serial No. 459,592, filed September 24, 1942, now Patent No. 2,416,958, dated March 4, 1947, a condition of equilibrium is obtained, together with an increased maximum lift coefficient for the wing.

Accordingly, it is another object of the present invention to provide novel and effective means for causing the elevator to deflect downwardly at high angles of attack to stabilize a tailless airplane of the type described and to increase the maximum lift coefficient obtained.

A third aspect of my invention deals with its use in conventional airplanes to increase the stick-free longitudinal stability of such airplanes and make them more difficult to stall. Another object of the invention, therefore, is to provide means responsive to a stalled or partially stalled condition of the wing for deflecting the elevators downwardly to produce a diving moment in the airplane, reducing the angle of attack of the wing and thereby averting the impending stall.

The above objects are attained by the use of a small, freely floating auxiliary flap which I prefer to call a "flipper," located in the trailing edge of the wing and operatively connected to a tab on its associated control surface. The flipper is free to trail in accordance with the chordwise pressure distribution over the wing surfaces ahead of the flipper, unrestrained by the pilot, causing the tab to be deflected accordingly to produce the desired behavior in the control surface. By suitable design of the linkage connecting the flipper to the tab and the proper proportioning of the various elements in the system, the present device can be made to change both the trailing tendency and the hinge moment of the control surface.

These and other objects and advantages of the present invention will become apparent to those skilled in the art after consideration of the following detailed description of the preferred embodiment thereof, reference being had to the accompanying drawings, in which.

Figure 1:
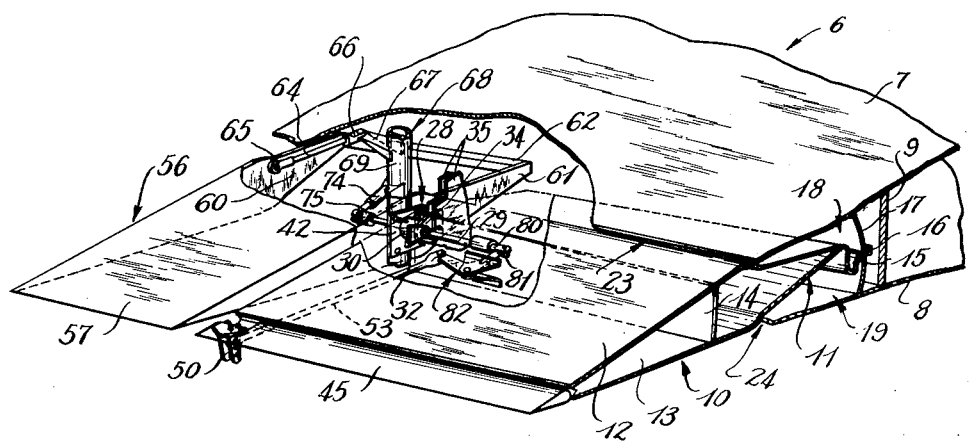
Fig. 1 is a fragmentary perspective view, partially broken away, of a portion of an airplane wing showing one embodiment of the present invention.
Figure 2:
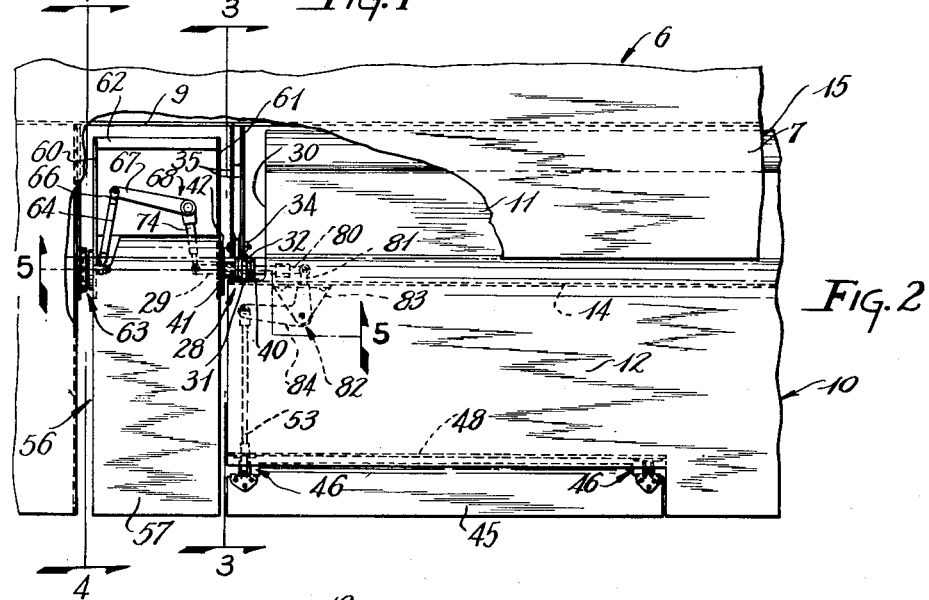
Fig. 2 is a top plan view of the same, also partially cut away.
Figure 3:
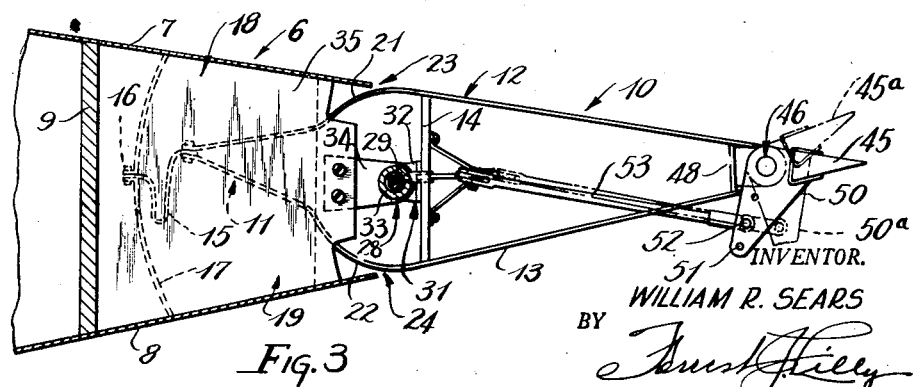
Fig. 3 is an enlarged sectional view taken along the line 3—3 in Fig. 2 and showing an end view of the control surface.
Figure 4:
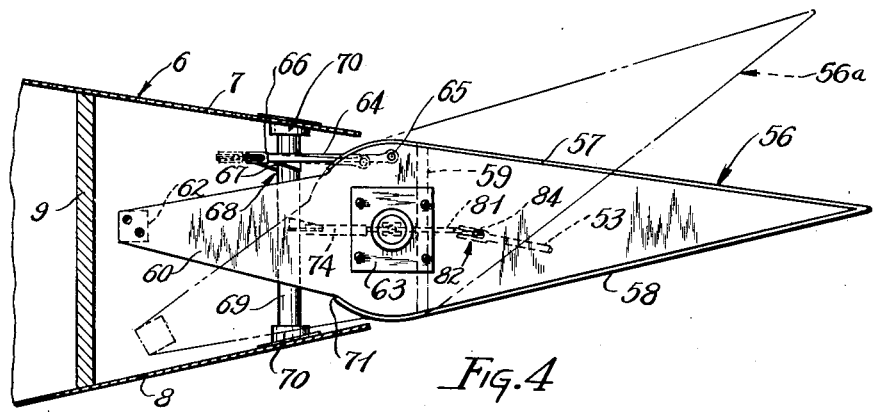
Fig. 4 is an enlarged sectional view taken along the line 4—4 in Fig. 2 and showing an end view of the flipper.
Figure 5:
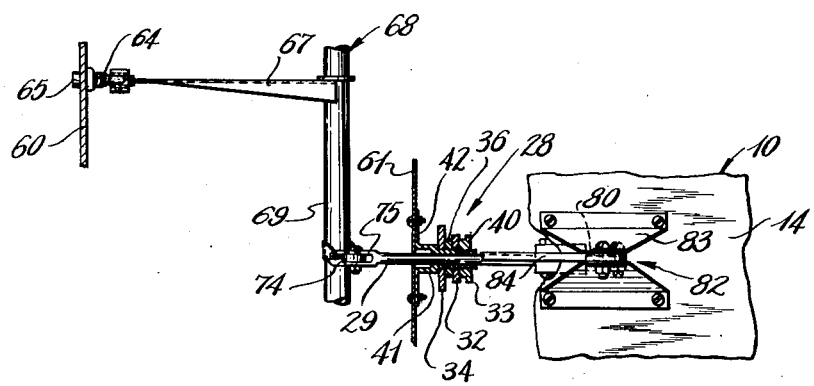
Fig. 5 is an enlarged sectional view taken along the line 5—5 in Fig. 2, showing a portion of the linkage connecting the flipper to the tab.

Figs. 1 to 5, inclusive, of the drawings illustrate my invention embodied in the control system of a tailless airplane wherein both pitch control and roll control are obtained by control surfaces known as elevons which are rigged for both simultaneous motion in the same direction to act as elevators and for motion in opposite directions to act as ailerons. In these drawings, the reference numeral 6 indicates a wing of the usual airfoil shape having an upper skin 7 and a lower skin 8, which are fixed to the top and bottom edges, respectively, of a spanwise extending spar 9. Located in the trailing edge of the wing and pivotally supported thereon for swinging movement about a transverse or spanwise axis is an elevon 10, shaped to carry out the airfoil contour of the wing when in neutral position and operatively connected to the control system of the airplane whereby it can be deflected upwardly or downwardly to produce the desired control force on the wing.

The elevon 10 is preferably, although not necessarily, of the internal balance type having a nose 11 which extends forwardly into the space between the top and bottom skins 7, 8 of the wing, and its structure is more or less conventional, comprising top and bottom skins 12 and 13 attached to a spanwise extending spar 14.

Fixed to the front end of the balance nose 11 and extending the full length of the elevon 10 is a flexible curtain seal 15, which is attached at 16 to an arcuate wall 17 mounted in the wing between the top and bottom skins 7 and 8, and which divides the chamber in the rear edge of the wing into two separate compartments 18 and 19. Sufficient slack is provided in the curtain seal 15 to permit the elevon to be swung to its extreme raised or lowered position.

The elevon 10 is curved or contoured chordwise thereof on its upper and lower surfaces at 21 and 22 to form arcs of a circle having the hinge axis of the elevon as its center. These curved portions 21, 22 are spaced a slight distance from the adjacent trailing edges of the upper and lower skins of the wing so as to provide slots 23 and 24 which are continuously open and thus provide constant communication between the chambers 18 and 19 and the pressure conditions at the upper and lower surfaces, respectively, of the wing and elevon. By virtue of the curvature at 21 and 22, the slots 23 and 24 are maintained continuously and uniformly spaced from the trailing edges of the upper and lower wing surfaces for all positions of the elevon.

When the airplane is in flight, there is normally greater air pressure at the under surface of the wing than at the upper surface thereof, and inasmuch as the upper and lower chambers 18, 19, respectively, are in constant communication with the pressure conditions at the upper and lower sides of the wing through the slots 23 and 24, the same pressure differential prevails on opposite sides of the nose 11 and curtain 15. Deflection of the elevons in one direction or the other causes a change in the pressure conditions at the slots 23, 24, altering the pressure differential on opposite sides of the balance nose 11 and producing a hinge moment in the direction to assist the pilot in deflecting the elevon. The above-described internal balance construction and its manner of operation are well known in the art, and further description thereof is not deemed necessary. It will be understood that any other form of aerodynamic balance might be used in place of the construction described, or such balances might be dispensed with entirely if their use is not required for a particular airplane design.

A plurality of spaced bearings carried by suitable brackets mounted on the wing provide support for the elevons, one of such bearings being located at the end of the elevon and indicated by the reference numeral 28. Bearing 28 differs from the others (not shown) in that it has a hollow center to permit passage of a push-pull rod 29, the purpose of which will be described presently. Space for the bearing 28 is provided by a cutout 30 formed in the elevon ahead of the spar 14 at one end thereof, and a T-shaped bracket member 31 is arranged in such cutout and fixed to the front side of the spar 14 with its flange 32 extending forwardly. The flange 32 is apertured to receive a tubular bearing 33 (see Fig. 5), and is rotatable thereon, said bearing being journaled, in turn, in a bearing plate 34 held between a pair of parallel brackets 35 which are mounted on and extend rearwardly from the rear spar 9 of the wing. A washer 36 is arranged between members 32 and 34 to space them apart, and the assembly is secured by a nut 40 threaded onto the end of the tube. The other end of the tube is enlarged in diameter at 41 to form a shoulder confining the plate 34, and is provided with a flange 42.

Hinged to the trailing edge of the elevon 10 is a tab 45 which is supported on bearings 46 mounted on a wall 48 carried by the elevon. A bracket or horn 52 is fixed to the tab at one of the hinge pivots thereof and extends downwardly, said horn being provided with a series of vertically spaced holes 51 through which a pin 52 is passed to connect a push rod or link 53 with the horn. The function of the tab 45 is to impose a hinge moment on the elevon tending to swing the latter upwardly or downwardly, depending upon the direction of displacement of the tab.

Arranged alongside the elevon 10 immediately adjacent one end thereof is an element 56 which I call a "flipper," which is connected through linkage to be described presently with the tab 45 whereby the position of the latter relative to the elevon 10 is determined by the position of the flipper relative to the wing. The flipper 56 is preferably in the form of a short length of flap similar in contour to the elevon 10 but not having the nose balance of the latter. The flipper comprises top and bottom skins 57 and 58 attached to a spar 59, and has end plates 60 and 61 which extend forwardly into the space between the top and bottom skins 7 and 8 of the wing. A counterweight bar 62 extends between and is attached to the front ends of the plates 60 and 61 to provide static balance for the flipper. The forward portions of the skins 57, 58 are arcuately curved about the hinge axis of the flipper as a center to clear the trailing edges of the surfaces of the wing and are interrupted to form a gap at 71. The right-hand end plate 61 is bolted or otherwise suitably attached to the flange 42 of the bearing 48, while the left-hand end plate 60 is supported on the wing structure by means of a bearing 63 coaxial with bearing 28.

A link 64 is connected at its rear end by a pivot bolt 65 to the left wall 60 of the flipper at a point spaced vertically above the axis of bearing 63, and extends forwardly therefrom. A yoke 66 at the front end of link 64 is pivotally connected to the outer end of a spanwise extending arm 67 of a bell crank member 68, arm 67 being welded to a vertical tube 69 which is arranged between the end plates 60, 61 and is journaled at its top and bottom ends in bearings 70 fixedly mounted on upper and lower skins 7, 8 of the wing. Fixed to the tube 69 below arm 67 is an arm 74 extending rearwardly therefrom through the gap 71 in the leading edge of the flipper and connected at its end to a yoke 75 carried at the left-hand end of push-pull rod 29.

Mounted on the right-hand end of the rod 29 is a yoke 80, which is connected to the forwardly extending arm 81 of a bell crank 82. The bell crank 82 is pivotally supported by a bracket 83 mounted on the back side of spar 14, arm 81 extending through a suitable slot in the spar. The other arm 84 extends laterally and is connected at its outer end to the front end of link 53.

The flipper 56, being pivotally supported on the wing and free to float, tends to trail in accordance with the chordwise pressure distribution over the wing surfaces ahead of the flipper at all times. Thus, at high angles of attack when the wing is stalled or partially stalled, the flipper tends to trail up to the position indicated at 56a in Fig. 4. This relative motion of the flipper is transmitted to the tab 45 through the agency of the connecting linkage, deflecting the tab to the position indicated at 45a in Fig. 3. The hinge moment on the elevon produced by the upwardly deflected tab acts to maintain the elevon in its neutral position, preventing the latter from swinging upwardly with the flipper and producing a stalling moment on the airplane. The effectiveness of the flipper 56 can be varied by moving the connection of the link 53 with horn 50 to one of the other holes 51.

If the airplane should encounter a sudden downward gust so that the angle of attack is momentarily negative, the flipper 56 will swing downwardly, causing the tab 45 to be deflected downwardly. By proper design of the flipper and connecting linkage, the tab 45 can be made to produce any desired effect on the behavior of the elevon 10. Thus, the flipper can be made to eliminate the force reversal heretofore experienced in tailless airplanes at high angles of attack when the wing is stalled or partially stalled or even produce a negatively trailing elevon for increasing the maximum lift coefficient of the wing in the same manner as a flap.

The invention illustrated in Figs. 1 to 5, inclusive, and described up to this point, is effective to produce deflection of the tab responsive only to displacement of the flipper 56 relative to the wing 6. Under certain conditions, it is also desirable to obtain deflection of the tab responsive to displacement of the elevon relative to the wing, in which case the tab acts as a boost tab imposing a hinge moment on the elevon to aid the pilot in swinging the elevon upwardly or downwardly.

Figure 6:
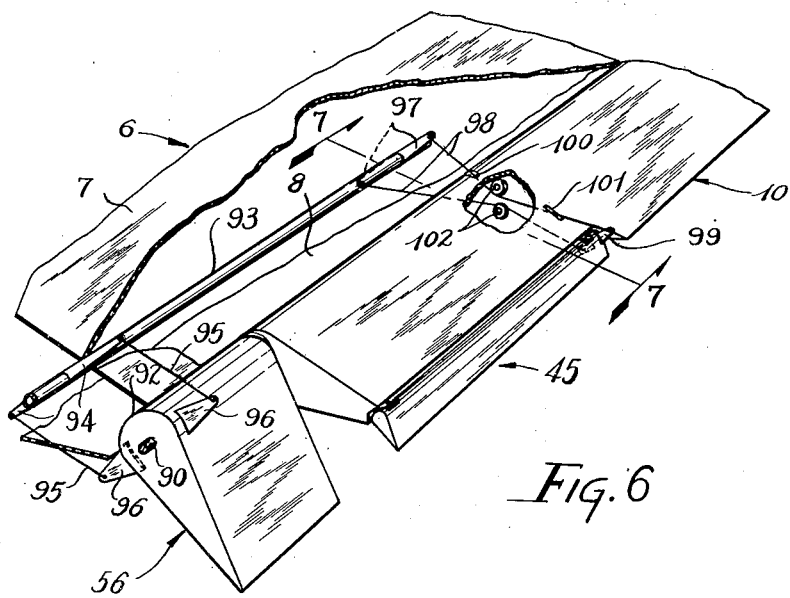
Fig. 6 is a perspective sectional view of another modification of the invention.
Figure 7:
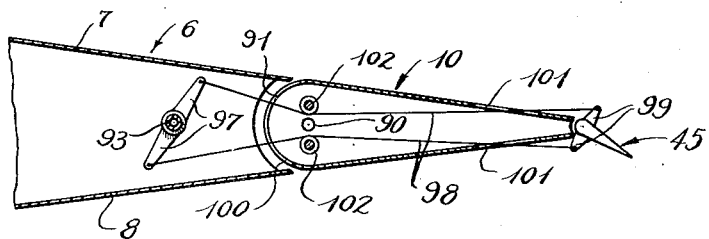
Fig. 7 is an enlarged section taken along the line 7—7 in Fig. 6.

Accordingly, another embodiment of my invention is illustrated in Figs. 6 and 7 in which deflection of the tab is effected by displacement of either the flipper or the elevon relative to the wing. In Figs. 6 and 7, the elevon 10 and the flipper 56 are shown more or less diagrammatically arranged alongside one another and supported on the wing for independent vertical swinging movement about a common hinge axis 90. The internal balance arrangement described in the previous embodiment has been omitted in this construction, and the leading edge of the elevon is shaped in a cylindrical curve at 91 having the hinge axis 90 as its center. Similarly, the counterbalance for the flipper 56 has been omitted, and the leading edge of the flipper is likewise curved cylindrically at 92 about the hinge axis 90 as its center. It should be kept in mind, however, that the arrangement shown is merely diagrammatical to illustrate the principles of the invention, and that such elements as balances and counterweights may be employed in any of their well known forms according to the dictates of the particular installation without departing from the substance of the invention.

The linkage connecting the flipper 56 with tab 45 is shown illustratively as comprising a shaft 93 extending parallel to the hinge axis 90 and rotatably supported on the wing 6 by suitable bearings (not shown). Oppositely extending arms 94 are fixed to the shaft 93 at one end thereof and are connected by links or cables 95 to horns 96 on the flipper. At the other end of the shaft 93 is a second pair of oppositely extending arms 97 which are connected by cables 98 to horns 99 on the tab. The cables 98 enter the elevons 10 through a vertical slot 100 in the leading edge portion 91 of the elevon and pass out through slots 101 in the upper and lower surfaces. Inside the elevon, the cables 98 are trained over a pair of sheave wheels 102 which are arranged on opposite sides of and spaced vertically from the hinge axis 90.

It will be seen from the foregoing that swinging movement of the flipper 56 relative to the wing responsive to the pressure conditions obtained for a given angle of attack is transmitted to the tab 45 through the interconnecting linkage causing the tab to be moved in the same direction through a proportional angular displacement, the ratio of proportionality being governed by the relative length of arms 94 to horns 96 and of arms 97 to horns 99. A hinge moment is thus produced on the elevon tending to resist movement of the latter with the flipper and to maintain the elevon in its original, undisturbed position. If the elevon 10 is deflected in one direction by the pilot while the flipper remains stationary, the tab 45 is deflected in the opposite direction relative to the elevon by reason of the fact that the cables 98, being attached at their forward ends to the stationary arms 97 and passing on either side of the hinge axis 90 at a distance therefrom, act in the same manner as parallel links. This type of booster or control tab action for the purpose of reducing the hinge moment on a control surface is well known in the art, but has heretofore been obtained by connecting the tab horn to a fixed point on the top or bottom surface of the wing itself. The present invention, however, combines the advantageous features of both the booster tab and the stabilizing tab, with resulting improvement in the controllability and stability of the airplane. The effectiveness of the booster tab action is determined by the ratio of the distance of the axes of sheave wheels 102 from the hinge axis 90 to the length of the moment arms of horns 99, and is increased by spacing the sheave wheels farther away from the hinge axis 90.

Figure 8:
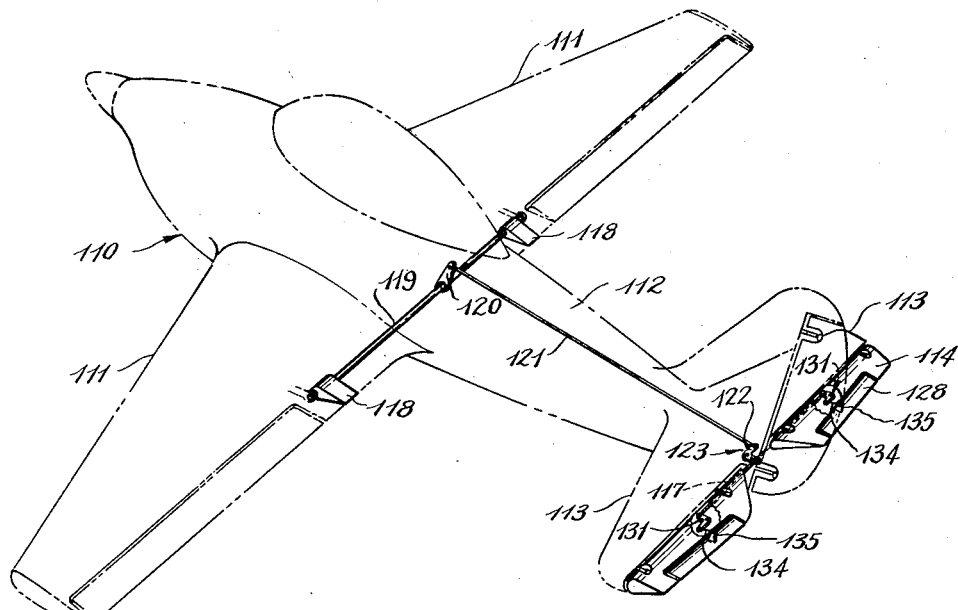
Fig. 8 is a phantom perspective view of a conventional airplane embodying one form of the invention.
Figure 9:
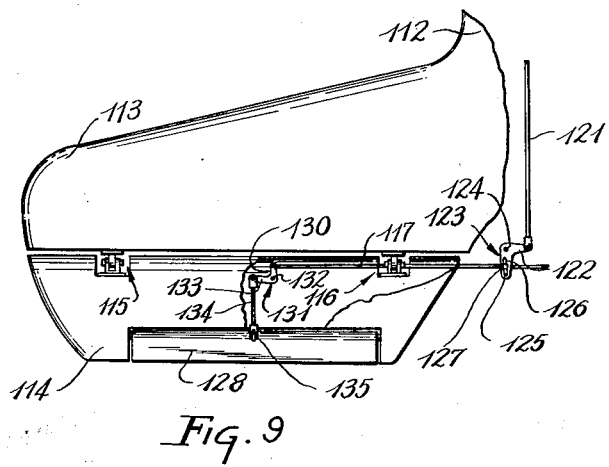
Fig. 9 is an enlarged plan view of the tail of the airplane, showing more clearly the arrangement of the linkage connecting the flipper to the tab on the elevator.

Another aspect of my invention relates to its use in conventional airplanes for the purpose of preventing stalls. This form of the invention is illustrated in Figs. 8 and 9 wherein the reference numeral 110 indicates an airplane having a wing 111 and fuselage 112. Carried at the tail end of the fuselage 112 are fixed stabilizers 113, and mounted on the trailing edges of the stabilizers are elevators 114. The elevators 114 are supported for vertical swinging movement on the stabilizers by means of bearings 115 and 116, the latter being hollow centered to permit passage of a push rod 117. Tabs 128 are hinged to the trailing edges of the elevators. A pair of flippers 118 are disposed in the trailing edge of the wing 111 in symmetrical arrangement on either side of the fuselage 112 and are pivotally supported for vertical swinging movement. Rigidly connected to each of the flippers 118 is a transversely extending rod or torque tube 119 having an upwardly extending arm 120 attached thereto within the fuselage. A link 121 connects the arm 120 to a transversely extending arm 122 of a bell crank 123. The bell crank 123 is pivotally mounted on a vertical hinge pin 124 in the tail of the fuselage and has a rearwardly extending arm 125 which is slotted at 126. A pin 127 fixed to the rod 117 is confined within and slides along the slot 126.

The outer ends of the link 117 are connected to arms 130 of bell cranks 131. Bell cranks 131 are pivotally supported on their respective rudders 114 by vertical pivot pins 132 and have laterally extending arms 133 which are connected by link 134 to horn 135 on the tab 128.

The principle of the linkage connecting the flippers 118 to the tabs 128 is seen to be similar to that shown in the first embodiment, and the position of the tabs is governed solely by the position of the flippers.

When the airplane is flying at a high angle of attack and the wing is on the verge of stalling, the flippers 118 swing upwardly responsive to the pressure of distribution obtained for a partially stalled wing, causing the tabs 128 to swing upwardly also. Upward deflection of the tabs 128 causes the elevators to swing downwardly relative to the stabilizers 113, producing a diving moment in the airplane tending to reduce the angle of attack and thereby averting the impending stall.

The purpose of using two flippers 118 arranged on either side of the fuselage 112 and rigidly interconnected by the shaft 119 is to eliminate the undesirable tab-control action which would otherwise be obtained with a single flipper when the flight conditions are unsymmetrical, such as, for example, when the airplane is being rolled. Oppositely acting moments in the flippers 118 are thus cancelled out, and the net tab-control action is a function of the mean angle of attack of the wing.

It is believed that a full understanding of the invention will be had from the foregoing, but it is to be understood that the drawings and description are to be considered as illustratively of and not restrictive on the broader claims appended hereto, for various changes in design, structure, and arrangement may be made without departing from the spirit and scope of said claims.

I claim:

1. In an aircraft, the combination of a wing, an elevator pivotally supported on the aircraft, a tab hinged to the trailing edge of the elevator, a flipper in the trailing edge of said wing pivotally mounted for swinging movement in a vertical plane and positioned with respect to said wing to swing in accordance with changes in chordwise pressure distribution over said wing, said flipper being free to trail upwardly at high angles of attack, and linkage means operatively connecting said flipper with said tab to move said tab to angles differing from the trailing angle thereof, said flipper and tab connecting means passing through the axis of rotation of said elevator whereby the angular relationship of said tab to said elevator is determined solely by the position of said flipper and is unaffected by the angular position of the elevator.

2. In an aircraft, the combination of a wing, an elevator, means on said aircraft including a hollow bearing for supporting said elevator for pivotal movement, a tab hinged to the trailing edge of said elevator, a freely trailing flipper pivotally mounted in the trailing edge of said wing, and linkage means connecting said flipper with said tab whereby the position of the tab relative to the elevator is determined by the position of the flipper relative to the wing, said linkage means including a push-pull rod slidably extending through said hollow bearing, and means connected with said tab for changing the position of the tab responsive to sliding movement of said push-pull rod through said hollow bearing.

3. In an aircraft, the combination of a wing, a control surface arranged in the trailing edge of said wing, means supporting said control surface on said wing for vertical swinging movement including a hollow bearing, a tab hinged to the trailing edge of said control surface, a flipper disposed alongside said control surface and pivotally supported on said wing for vertical swinging movement, a first bell crank pivoted on said wing for rotation about a substantially vertical axis, a link connecting one arm of said bell crank to said flipper at a point spaced vertically from its axis of rotation, a push-pull rod having one end connected to the other arm of said bell crank and extending slidably through said hollow bearing into the interior of said control surface, a second bell crank arranged within the interior of said control surface and having one arm thereof connected to the other end of said push-pull rod, and link means connecting the other arm of said last-named bell crank to said tab for operating the same.

4. In an aircraft, the combination of a wing, a control surface arranged in and pivotally supported on the trailing edge of said wing, a tab hinged to the trailing edge of said control surface, a flipper disposed alongside said control surface and pivotally supported at the trailing edge of said wing, a member rotatably supported on said wing, means connecting said member with said flipper whereby movement of the flipper causes said member to rotate, and force transmitting means connecting said member with said tab and passing the pivot axis of said control surface at a distance therefrom whereby movement of the control surface relative to the wing causes said tab to be deflected in a direction and amount to produce a hinge moment assisting such movement, while movement of the flipper relative to the wing in a given direction causes said tab to be deflected in a direction and amount to produce a hinge moment on the control surface acting in the opposite direction.

5. In an aircraft, the combination of a wing, a control surface pivotally supported at the trailing edge of said wing and connected to be moved by a pilot of said aircraft, a flipper, pivotally supported at the trailing edge of said wing and free to trail in accordance with the chordwise pressure distribution over said wing ahead of said flipper, a tab hinged to said control surface at the trailing edge thereof along a hinge line parallel to that of said flipper, and means connecting said flipper to said tab to move said tab to angles differing from the trailing angle thereof when said control surface or said flipper is moved away from neutral position to apply an additional hinge moment to said control surface.

6. Apparatus in accordance with claim 5 wherein said connection is made to create said additional hinge moment in opposition to a hinge moment created on said control surface by virtue of a change in angle of attack of said wing.

7. Apparatus in accordance with claim 5 wherein said connection is made to create said additional hinge moment in opposition to a hinge moment created on said control surface by virtue of a change in angle of attack of said wing, and sufficient in degree to substantially counterbalance any tendency of said control surface to trail upwardly at high angles of attack of said wing.

8. Apparatus in accordance with claim 5 wherein said control surface and said flipper are positioned closely adjacent at the trailing edge of said wing to have closely related trailing tendencies.

9. In an aircraft, the combination of a wing, a pitch control surface hinged to said aircraft and connected to be swung vertically by the pilot of said aircraft to change the angle of attack of said wing, a flipper located in the trailing edge of and forming a part of said wing, and pivotally hinged thereto on a horizontal axis with respect to said aircraft when in level position for free vertical swinging movements when acted upon by changes in the chordwise pressure distribution over the wing due to changes in the angle of attack, said flipper, because of said pressure changes, having a characteristic tendency at low or moderate angles of attack to deflect upwardly with respect to the wing in relatively small angular increments for a given increment in angle of attack, and as the wing approaches the stalling angle, to deflect upwardly in considerably larger angular increments, a tab hinged to said control surface along a line parallel to that of said control surface and movable with respect to said surface to produce a hinge moment thereon, and means connecting said flipper to said tab to move said tab to angles producing hinge moments on said control surface substantially proportional to the angular deflection of said flipper and tending to move said control surface in a direction to reduce the angle of attack of said wing.

10. In an aircraft, the combination of a wing, a pivotally supported pitch control surface having a movable element thereon capable of producing an aerodynamic force to create a hinge moment on the control surface, said control surface being connected to be moved by the pilot of said aircraft to change the angle of attack of said wing, a flipper located in the trailing edge of and forming a part of said wing, and pivotally hinged thereto on a horizontal axis with respect to said aircraft when in level position for free vertical swinging movements when acted on by changes in the chordwise pressure distribution over the wing due to changes in the angle of attack, said control surface and said flipper having a characteristic tendency at low or moderate angles of attack to deflect upwardly with respect to the wing in relatively small angular increments for a given increment in angle of attack, and as the wing approaches the stalling angle, to deflect upwardly in considerably larger angular increments, and means connecting said flipper to said element to move said element with respect to said control surface in a direction and by an amount to produce a hinge moment on said control surface of progressively increasing magnitude as the wing approaches the stalling angle.

11. In an aircraft, the combination of a wing, a pitch control surface pivotally supported for vertical movement on said wing and forming a part of the trailing edge thereof and connected to be moved by the pilot of said aircraft, a tab hinged to the trailing edge of said control surface for vertical movement with respect to said control surface, a flipper located in the trailing edge of said wing adjacent one end of said control surface, and pivotally hinged to said wing for free vertical swinging movements when acted on by changes in the chordwise pressure distribution over the wing due to changes in the angle of attack, said control surface and said flipper having a characteristic tendency at low or moderate angles of attack to deflect upwardly with respect to the wing in relatively small angular increments for a given increment in angle of attack, and as the wing approaches the stalling angle, to deflect upwardly in considerably larger angular increments, and means connecting said flipper to said tab to move the tab in a direction and to a degree creating a hinge moment on said control surface substantially counter-balancing the tendency of said control surface to trail upwardly with said flipper.

WILLIAM R. SEARS.

REFERENCES CITED

The following references are of record in the file of this patent:

UNITED STATES PATENTS

| Number | Name | Date |
| --- | --- | --- |
| 1,464,784 | Tarbox | Aug. 14, 1923 |
| 1,573,109 | Zottel | Feb. 16, 1926 |
| 1,659,960 | Rohrbach | Feb. 21, 1928 |
| 1,851,797 | Almeida | Mar. 29, 1932 |
| 1,935,824 | Upson | Nov. 21, 1933 |
| 2,057,877 | Bragunier | Oct. 20, 1936 |
| 2,156,994 | Lachmann | May 2, 1939 |
| 2,254,304 | Miller | Sept. 2, 1941 |
| 2,368,059 | White | Jan. 23, 1945 |

FOREIGN PATENTS

| Number | Country | Date |
| --- | --- | --- |
| 691,115 | Germany | May 17, 1940 |
| 694,306 | Germany | July 29, 1940 |
| 23,309 | France | June 6, 1921 |
| | (Addition to No. 400,578) | |